United States Patent

Lang

[11] 4,318,304
[45] Mar. 9, 1982

[54] FORCE LIMITING DEVICE

[75] Inventor: David J. Lang, Rockford, Ill.

[73] Assignee: Sundstrand Corporation, Rockford, Ill.

[21] Appl. No.: 139,326

[22] Filed: Apr. 11, 1980

[51] Int. Cl.³ .................... F16H 27/02; F16H 29/20
[52] U.S. Cl. ............................ 74/89.15; 74/412 TA
[58] Field of Search .................. 74/412 TA, 424.8 R, 74/89.15; 408/11; 192/8 R, 141; 64/28 R

[56] References Cited

U.S. PATENT DOCUMENTS

| | | | |
|---|---|---|---|
| 3,269,199 | 8/1966 | Deehan et al. | 74/89.15 |
| 3,634,002 | 1/1972 | Vollrath | 74/89.15 |
| 3,802,281 | 4/1974 | Clarke | 74/89.15 |
| 3,968,705 | 7/1976 | Amano et al. | 74/424.8 R |
| 3,994,178 | 11/1976 | Hore | 74/89.15 |
| 4,184,345 | 1/1980 | Cutler | 64/28 R |

FOREIGN PATENT DOCUMENTS

2101704 8/1972 Fed. Rep. of Germany ........ 408/11

*Primary Examiner*—Lawrence J. Staab
*Attorney, Agent, or Firm*—Ted E. Killingsworth; Michael B. McMurry; Harold A. Williamson

[57] ABSTRACT

The invention relates to a force limiting assembly that includes a force transmitting reciprocating output member carried by an actuator member mounted at one end for rotation in a force limiting assembly housing. A power input member is secured to the actuating member in the housing. The assembly is provided with a release mechanism secured to the assembly housing and mechanically releasably secured to the actuating member to thereby permit the actuating member to move axially into the housing. The axial movement into the housing occurs only when an axial force present in the actuating member, which force is directed towards the housing, exceeds a preset value which results in the sudden release and movement of the actuating member and the power input member into locking cooperation with a portion of the assembly housing. While the power input member is in locking cooperation with the housing, no further input power may be transmitted from the power input member to the actuating member and the force transmitting output member. The release mechanism additionally allows the actuating member and the input member to have limited movement in a direction along the actuating member away from the housing whenever a predetermined force is applied to the actuating member in the direction away from the housing. The input member, when experiencing the movement in a direction away from the housing, cooperatively mechanically locks with a portion of the housing, whereupon no further input power may be transmitted from the power input member to the actuating member and the force transmitting output member.

18 Claims, 7 Drawing Figures

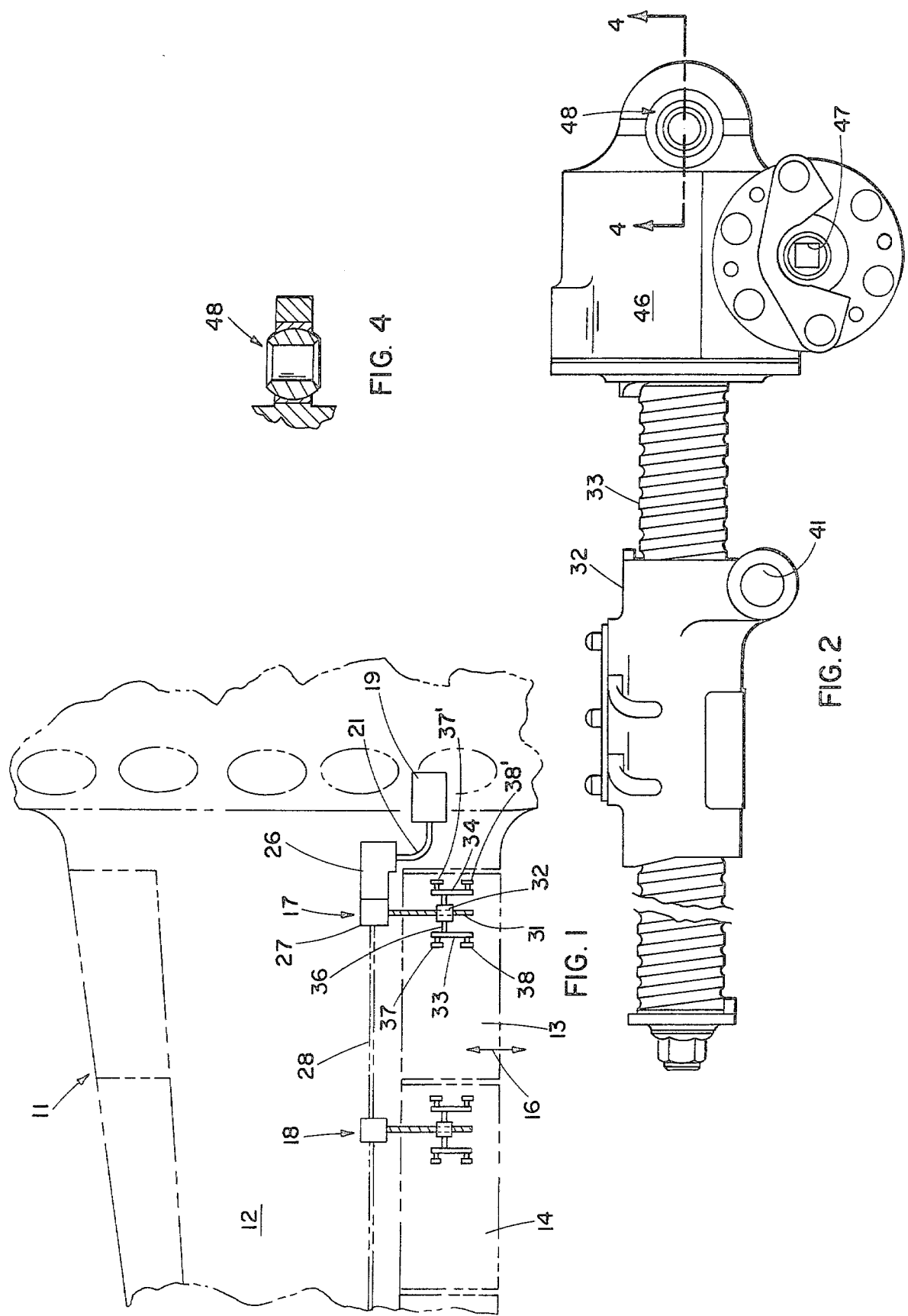

FORCE LIMITING DEVICE

TECHNICAL FIELD

This invention relates to a force limiting assembly of the ball and screw type employed in a flight control actuation system.

BACKGROUND ART

Historically, it has been recognized, especially in actuation of the control surfaces of aircraft or linkages thereto, that should a jam occur anywhere in the actuation path, the power delivered to the jammed linkages or control surfaces could result in serious damage to the aircraft structure or the flight control surfaces themselves.

The developers of recirculating ball and screw type actuators have long recognized that overloading of the actuator may occur when excessive loads are encountered. In order to prevent damage to the actuator or to the apparatus being operated, many load absorbing mechanisms have been produced. Typical of this effort is the arrangement shown in the Clarke U.S. Pat. No. 3,802,281. The Clarke patent discloses a driving arrangement for a lead screw 21 mounted for reciprocation in a recirculating ball nut assembly 18. The nut assembly 18 is, in turn, mounted in a tubular drive member 14 that has integral, therewith, a spur gear 17 which is drivingly connected to a bevel gear arrangement 11, 12. Power is delivered through the bevel gear arrangement 11, 12 to the actuator. The drive member 14 is resiliently coupled to the nut 18 so as to be rotatable relative to the nut member 18 at a predetermined torque load. A brake in the form of rollers 31 jammed against the actuator body 10 operates in response to the aforementioned relative rotation. A flange 33 on nut 18 cooperates with friction pad 35 to brake the rotary motion of the nut when an axial load is applied to the lead screw. The invention to be described hereinafter does away with the requirement that the nut portion of the assembly senses the presence of the excess load. The instant invention depends only on the detection of excessive axial loading present in the actuator screw.

DISCLOSURE OF INVENTION

The present invention relates to a force limiting assembly that includes a force transmitting reciprocating output member carried by an actuator member mounted at one end for rotation in a force limiting assembly housing. A power input member is secured to the actuating member in the housing. The assembly is provided with a release mechanism secured to the assembly housing and mechanically releasably secured to the actuating member to thereby permit the actuating member to move axially into the housing. The axial movement into the housing occurs only when an axial force present in the actuating member, which force is directed towards the housing, exceeds a preset value which results in the sudden release and movement of the actuating member and the power input member into locking cooperation with a portion of the assembly housing. While the power input member is in locking cooperation with the housing, no further input power may be transmitted from the power input member to the actuating member and the force transmitting output member. The release mechanism additionally allows the actuating member and the input member to have limited movement in a direction along the actuating member away from the housing whenever a predetermined force is applied to the actuating member in the direction away from the housing. The input member, when experiencing the movement in a direction away from the housing, cooperatively mechanically locks with a portion of the housing, whereupon no further input power may be transmitted from the power input member to the actuating member and the force transmitting output member.

It is therefore a primary object of this invention to provide a force limiting device for use in conjunction with a ball/nut and screw actuator that responds to forces present in the screw to limit the transmission of power to the screw should the ball/nut carried on the screw experience excess axial loading.

A further object of this invention is to provide a force limiting assembly for use in conjunction with a ball/nut and screw actuator that has a preset load limit beyond which, the force limiter locks up to preclude the further transmission of power to the ball/nut and screw actuator.

In the attainment of the foregoing objects, the invention contemplates that the force limiting assembly includes a lead screw carrying a recirculating ball/nut which reciprocates in its travel along the screw and functions as the output for the force limiting assembly. The screw is mounted at one end for rotation in the force limiting assembly. A power input spur gear is secured to the screw. The spur gear has teeth disposed on each side, thereof, at an angle to the spur gear sides. An assembly housing is provided that has secured internally, thereof, annular pairs of gear teeth sets spaced apart on either side of the spur gear and out of engagement with the spur gear. A release mechanism is secured to the assembly housing and is mechanically releasably coupled to the screw to thereby permit the screw to move axially into the housing only when an axial force present in the screw, directed towards the housing, exceeds a preset value. The release results in the sudden movement of the screw and attached spur gear such, that the teeth on the side of the spur gear engage the gear teeth set carried by the assembly housing, whereupon no further rotary motion may be transmitted from the input spur gear to the screw and the recirculating ball/nut output.

The release mechanism also allows the screw and input spur gear to have limited movement in a direction along the screw away from the assembly housing whenever a predetermined force is applied to the actuating member in a direction away from the housing. The side teeth of the input spur gear, upon movement, are caused to engage the other annular gear teeth set, whereupon no further rotary motion may be transmitted from the input spur gear to the screw and the recirculating ball/nut output.

The force required to affect the sudden release is, by design, greater than the force required to move the actuating member in a direction away from the housing. There is also provided belleville springs which act between the spur gear and the release mechanism and the spur gear and a nut secured to the screw.

Other objects and advantages of the present invention will be apparent upon reference to the accompanying description when taken in conjunction with the following drawings:

BRIEF DESCRIPTION OF DRAWINGS

FIG. 1 illustrates, schematically, a portion of an aircraft fuselage and wing in which the invention finds utility;

FIG. 2 depicts a force limiting assembly that embodies the invention;

FIG. 4 is a sectional view taken along the line 4—4 of FIG. 1;

BEST MODE FOR CARRYING OUT THE INVENTION

Figure 3:
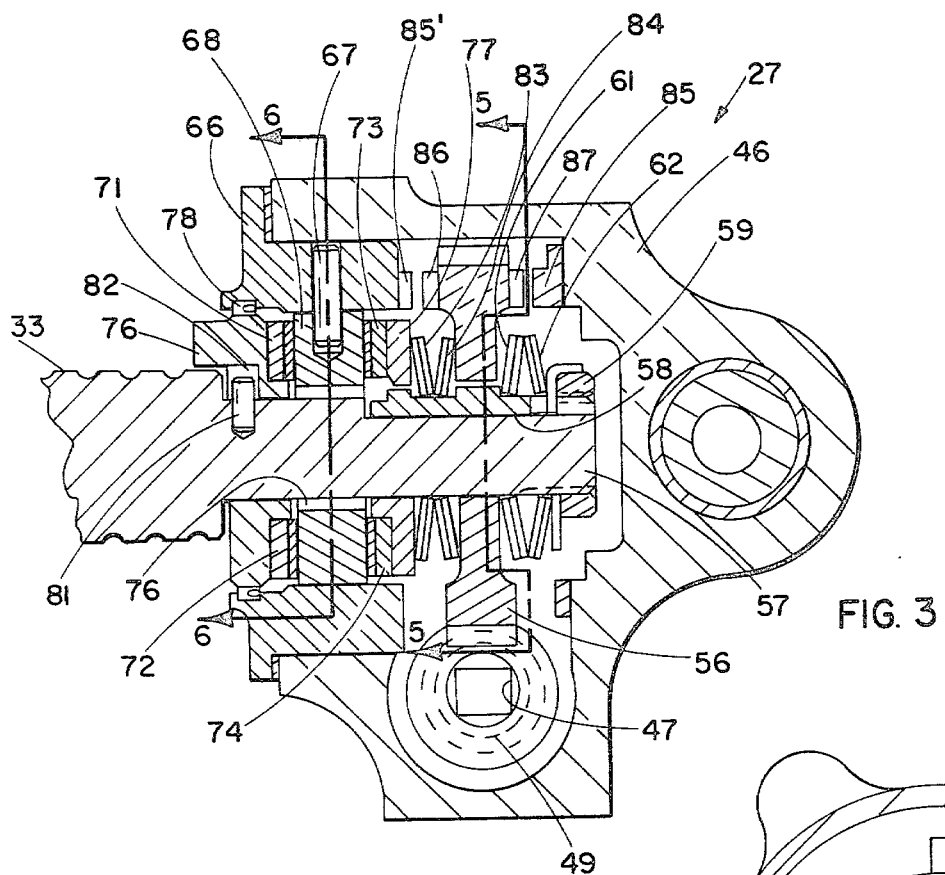
FIG. 3 is a front plan view in full section of a portion of the force limiting assembly of FIG. 2.

Reference is now made to FIG. 1 which illustrates in broken line, a portion of an aircraft wing and fuselage 11. The invention to be described hereinafter, finds utility in an aircraft environment where there are a number of components that must be operated in unison. It should be understood that while the invention will be described in respect of an aircraft environment, the force limiting assembly that embodies the invention will find utility in a wide range of environments, wherever there is a concern that an element being driven in a reciprocating manner may experience a jamming. As noted earlier, the presense of a jam in a linkage and the continued application of force to the linkage can result in damage not only to the linkage, but to the structures surrounding and supporting the linkage. In an aircraft 11 there are, as shown in FIG. 1 along the wing 12, a plurality of flaps 13, 14. The flaps 13, 14 provide the control surfaces for the wing 12, and their movement from a flap stored position to a flap actuated position, as shown by arrow 16, is controlled by motion translating devices 17 and 18. Power is delivered to the power translating devices 17 and 18 from a power drive unit 19 via a flexible shaft 21 which is connected to and through an angle gear box 26 to a force limiting assembly 27. Power is delivered to the motion translating device 18 via a flexible shaft 28 shown in dotted outline. The motion translating device 18 is shown in dotted outline and its details are the same as the motion translating device 17 which will be explained and described in detail hereinafter.

The motion translating device 17 includes, as was noted earlier, a force limiting assembly 27 that has secured therein and extending therefrom, a lead screw 31. The lead screw 31 has mounted thereon a recirculating ball/nut assembly 32. A pair of carriages 33, 34 are secured by a bolt 36 to the recirculating ball/nut assembly 32. The carriage 33, 34 each carry a pair of wheels 37, 38 and 37', 38'. The manner in which the wheels 37, 38 and 37', 38' are secured to the flap 13 are not shown. The manner in which the carriage 33, 34 and wheels 37, 38 and 37', 38' are secured to the flap 13 does not form a part of this invention. It is sufficient to note that reciprocating movement imparted to the carriage from the screw and nut assembly 32 is delivered to the flap 13 to move it back and forth as indicated by arrow 16. The recirculating ball/nut assembly 32, which forms the output member of the force limiting assembly, is driven in a reciprocating fashion by the rotation of the lead screw 31 passing therethrough. Rotary motion to the lead screw 31 is provided by power drive unit 19 through flexible shaft 21, angle gear box 26 and force limiting assembly 27. In the event that the carriage 33, 34 and the wheels 37, 38 and 37', 38' become jammed, the continued application of power through the screw 31 to the recirculating ball/nut assembly 33 can result in damage to the structure of the flap 13. The force limiting assembly 17 must prevent the flap actuating system from damaging the aircraft's structure in the event of a jam of the aircraft's structure surface and/or linkages. If a jam occurs in a flap linkage, or in a flap tract not shown, the force limiting assembly in the motion translating device at the location of the jam, must prevent the power drive unit 19 stall torque from damaging the aircraft structure or flight surface. After the force limiting assembly 27 has functioned, it is desirable that the actuation system become inoperative and the control surface such as flaps 13, 14 are held in fixed position to maintain control of the aircraft. The force limiting assembly 27, to be described more fully hereinafter, provides additional protection to all system components such as flap 14 and motion translating device 18 downstream of the force limiting assembly 27 that is experiencing a jam.

Reference is now made to FIG. 2 which shows in greater detal the motion translating device 17 of FIG. 1. Clearly seen in FIG. 2 are lead screw 33 on which is carried the recirculating ball/nut assembly 32. Though not shown in this figure, bolt 36 fits through opening 41 in recirculating ball/nut assembly 32. The screw 33 is rotatably mounted in a force limiting assembly housing 46. The details by which the screw 33 is mounted within the force limiting assembly housing 46 will be explained in detail in respect of a discussion of FIG. 3 to follow. A square drive opening 47 is provided to receive a power input from the angle gear box 26 of FIG. 1. At the right-hand side of the force limiting assembly housing 46, as FIG. 2 is viewed, there is provided a ball joint unit 48. The details of the ball joint unit 48 are shown in FIG. 4. The ball joint 48 allows for a universal connection to be made to a portion of the aircraft's structure not shown.

Figure 5:
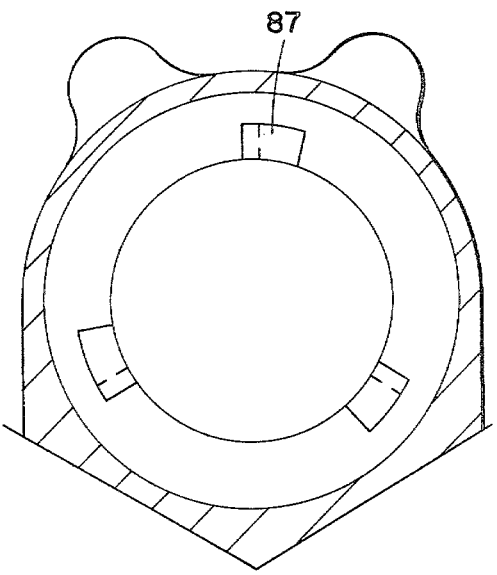
FIG. 5 is a view of a partial section taken along the line 5—5 of FIG. 3.
Figure 6:
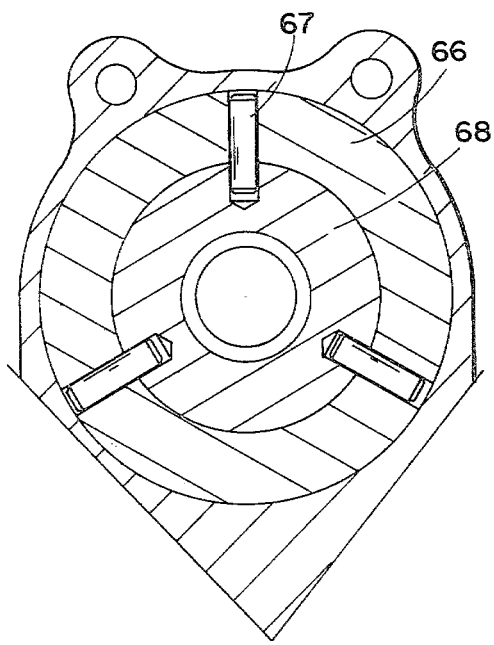
FIG. 6 is a view of a partial section taken along the line 6—6 of FIG. 3.
Figure 7:
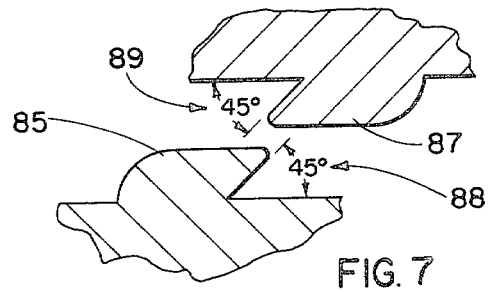
FIG. 7 is an illustration of the mating relationship of spur gear side teeth and assembly housing gear teeth.

Reference is now made to FIG. 3 which shows in section the force limiting assembly 27. The force limiting assembly housing 46 has mounted therein, a worm gear 49 shown in broken line. The worm gear 49 has passing axially therethrough, the square drive opening 47. Power is delivered to the force limiting assembly 27 through the worm gear 49. A helical spur gear 56 is shown in mating engagement with worm gear 49. The helical spur gear 56 is securely mounted on a reduced diameter end of portion 57 of lead screw 33. A key 58 positioned as shown, keeps the helical spur gear 56 from rotating on reduced diameter end portion 57. A jam nut 59 is shown secured to reduced diameter end portion 57. Positioned between the helical spur gear 56 and the jam nut 59 are belleville springs 61, 62. A bearing housing support 66 is secured, by means not shown, to force limiting housing assembly 46. A shear pin 67 is shown passing through a portion of the bearing housing support 66 and entering a block or collar 68. The collar 68 is positioned between needle roller bearing sets 71, 72 and 73, 74 which needle roller bearing sets 71, 72 and 73, 74 are supportedly carried by bearing race 76 and 77. A self-lubricating bearing sleeve 76 is positioned between collar 68 and reduced diameter end portion 57 of screw 33. A radial seal 78 is shown fitted between bearing race 76 and bearing housing support 66. A pin 81 is fitted into reduced diameter end portion 57 of screw 33 in the manner shown. The pin 81 slidingly engages a slot 82 in bearing race 76. To the right of bearing race 77, there is positioned a pair of belleville springs 83, 84 as shown. The helical spur gear 56 has formed integrally with the sides thereof, gear teeth 86, 87. The arrangement of the gear teeth on the sides of helical spur gear 56 is shown in FIG. 5. The force limit assembly housing 46 has integrally secured thereto, a pair of annular sets of gear teeth 85, 85'. The mating relationship of the gear teeth 87, 85 can best be seen in a study of FIG. 7 which depicts the teeth 85 and 87 having negative rake angles 88, 89. The arrangement and location of shear pin 67 is best seen in FIG. 6.

The shear pin 67, bearing housing support 66 and collar 68 provide a release mechanism for the screw 33. In the event that the recirculating ball/nut assembly 32 is stopped in its travel away from the force limiting assembly housing 46 as a result of a jamming, there will appear in lead screw 33, an axially directed force along the screw 33 towards the force limiting assembly housing 46 which force will be felt by needle roller bearing set 71, 72. The thickness and material of which the shear pin 67 is fashioned will control or set the limit of force that can be applied axially to the collar 68 through the bearings 71, 72. Should the loading of the screw 33 exceed the shear strength of shear pin 67, the collar 68 and the associated bearing assembly will move to the right as seen in this figure. Movement to the right will be sudden and will result in the teeth 87 on the side of helical spur gear 56 being driven into engagement with the annular set of gear teeth 85 secured to the force limiting assembly housing 46. The engagement of these gear teeth 87, 85 precludes any further rotary motion that may be transmitted from the worm gear 49 through the helical spur gear 56 to the screw 33.

In the event that the recirculating ball/nut assembly 32 is moving to the right, as FIG. 2 is viewed, and a jamming occurs, the loading that the screw 33 will experience is such that a force will be present in the screw 33 in a direction away from the force limiting assembly housing 46. The force just noted in a direction away from the housing 46 is transmitted through the reduced diameter end portion 57 to the jam nut 59 and thence through belleville springs 61, 62, helical spur gear 56, belleville springs 83, 84 to bearing race 77. The force just noted will cause the compression of belleville springs 83, 84 allowing the helical spur gear 56 to move to the left as FIG. 3 is viewed, which results in the engagement of helical spur gear side teeth 86 with gear teeth 85' carried by bearing housing support 66. The engagement of these teeth precludes the further transmission of power from the worm gear 49 to and through the helical spur gear 56 to the screw 33.

The foregoing description of the invention clearly presents a force limiting device that responds to axial forces present in a screw and ball/nut actuator, whereby excessive axial load arising in the screw results in the lockup of the screw to preclude further transmission of power through the screw to the ball/nut load actuator.

Although this invention has been illustrated and described in connection with this particular embodiment, it will be apparent to those skilled in the art that various changes may be made therein without departing from the spirit of the invention as set forth in the appended claims.

I claim:
1. A force limiting assembly including in combination:
   a force transmitting reciprocating output member carried by an actuating member mounted at one end for rotation in a force limiting assembly housing;
   a power input member secured to said actuating member in said housing, said force transmitting reciprocating member capable of being driven in a direction away from and towards said assembly housing by said actuating member; and
   said assembly having a sudden release means secured to said assembly housing and mechanically suddenly releasably secured to said actuating member to thereby permit said actuating member to move axially into said housing when an axial force present in said actuating member arises while said force transmitting member is being driven away from said assembly housing, and said axial force directed towards said housing exceeds a preset value which results in the sudden release and movement of said actuating member and said power input member into locking cooperation with a portion of said assembly housing, whereupon no further input power may be transmitted from said power input member to said actuating member to drive said force transmitting output member away from said assembly housing.

2. The combination of claim 1, wherein said actuating member and said release means allow said actuating member and input member to have limited movement in a direction along said actuating member away from said housing whenever a predetermined force is applied to said actuating member in said direction away from said housing; and,
   said input member upon said movement cooperatively mechanically locking with a portion of said assembly housing, whereupon no further input power may be transmitted from said power input member to said actuating member and said force transmitting output member.

3. The combination of claim 2, wherein said force in the direction of said housing required to affect said sudden release is greater than said force required to move said actuating member in a direction away from said housing.

4. The combination of claim 3, wherein said actuating member is a screw.

5. The combination of claim 4, wherein said input member is a spur gear having teeth disposed at an angle to the sides of said spur gear, and said housing has an annular set of teeth spaced apart from said spur gear on either side thereof and out of engagement with said spur gear.

6. The combination of claim 5, wherein there is provided biasing means acting between said spur gear and said release means and said spur gear and a portion of said screw.

7. The combination of claim 6, wherein said baising means are belleville springs.

8. The combination of claim 7, wherein said release means includes a shear pin having a first portion thereof securely mounted in said housing, and a second portion mounted in a block member mounted adjacent a shoulder on said screw.

9. The combination of claim 8, wherein said output member is a ball circulating nut.

10. The combination of claim 9, wherein said housing is provided with a ball joint pivotal unit to allow the universal connection of the force limiting assembly to an object.

11. A force limiting assembly including in combination; a screw carrying a force transmitting reciprocating output member;
   said screw mounted at one end for rotation in said force limiting assembly;
   a power input spur gear secured to said screw;
   said spur gear having teeth disposed on one side thereof at an angle to said spur gear sides;
   an assembly housing having secured thereto an annular set of gear teeth spaced apart and out of engagement with said spur gear; and,
   sudden release means secured to said assembly housing and mechanically suddenly releasably coupled to said screw to thereby permit said screw to move axially into said housing only when an axial force present in said screw arises while said force transmitting output member is being driven away from said assembly housing, and said axial force directed towards said housing exceeds a preset value which results in the sudden movement of said screw and said spur gear, such that said teeth on the side of said spur gear engage said annular gear teeth set, whereupon no further rotary motion may be transmitted from said input spur gear to said screw to drive said force transmitting member away from said assembly housing.

12. The combination of claim 11, wherein said screw and said release means allow said screw and input spur gear to have limited movement in a direction along said screw away from said housing whenever a predetermined force is applied to said actuating member in said direction away from said housing; and,
   said input spur gear upon said movement cooperatively mechanically locking with a portion of said assembly housing, whereupon no further input power may be transmitted from said power input spur gear to said screw and said force transmitting reciprocating output member.

13. The combination of claim 12, wherein said force in the direction of said housing required to affect said sudden release is greater than said force required to move said actuating member in a direction away from said housing.

14. The combination of claim 13, wherein there is provided biasing means acting between said spur gear and said release means and said spur gear and a portion of said screw.

15. The combination of claim 14, wherein said baising means are belleville springs.

16. The combination of claim 15, wherein said release means includes a shear pin having a first portion thereof securely mounted in said housing, and a second portion mounted in a block member mounted adjacent a shoulder on said screw.

17. The combination of claim 16, wherein said output member is a ball circulating nut.

18. The combination of claim 17, wherein said housing is provided with a ball joint pivotal unit to allow the universal connection of the force limiting assembly to an object.

* * * * *